Aug. 8, 1967 R. N. SMITH 3,334,779
CLOSURE FOR AUTOMOTIVE FUEL TANKS AND THE LIKE
Filed Sept. 9, 1965
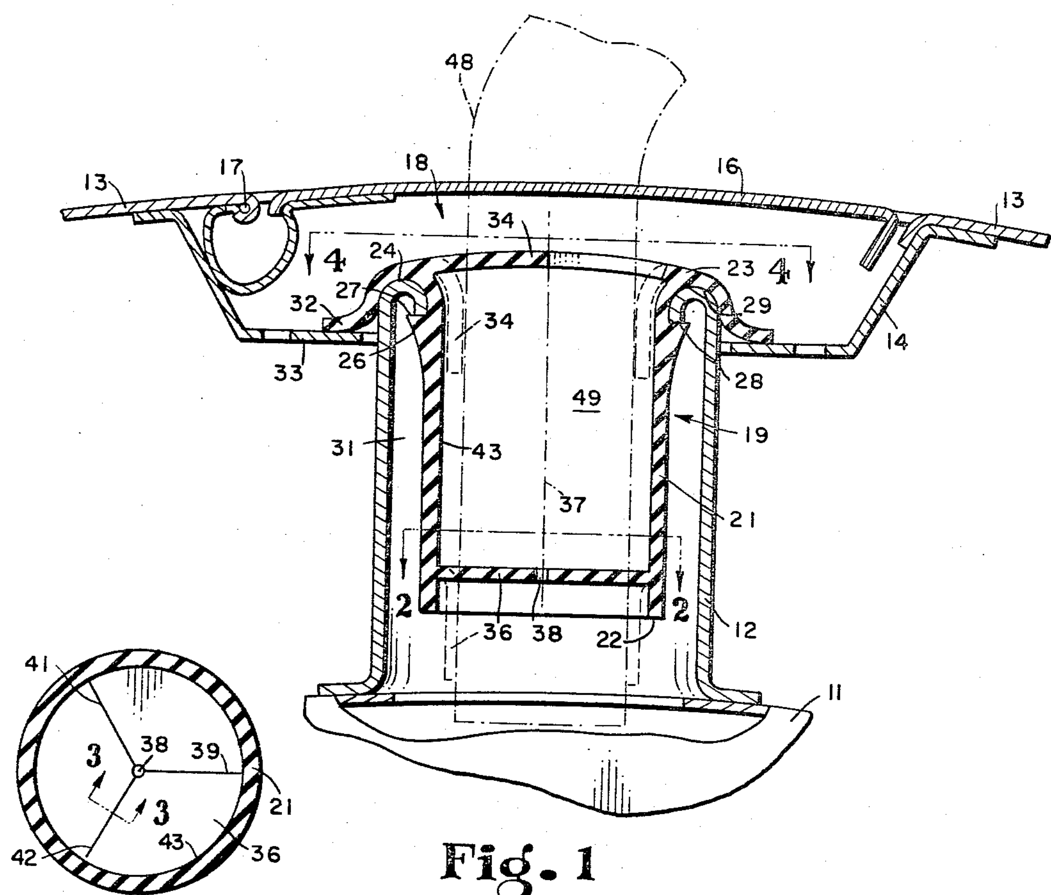
Fig. 1
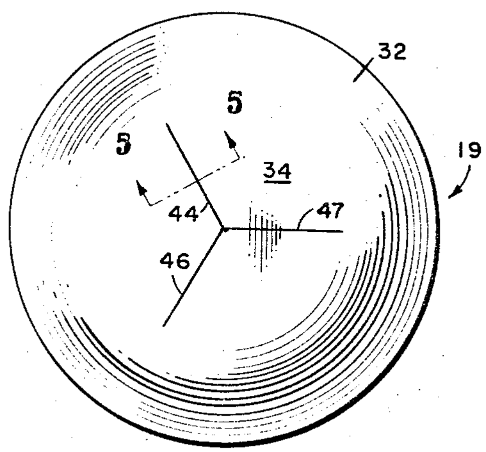
Fig. 2
Fig. 4
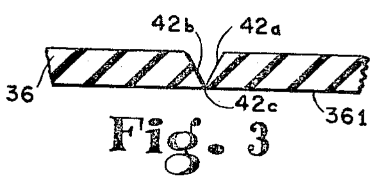
Fig. 3
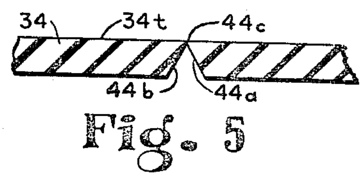
Fig. 5
INVENTOR
RICHARD N. SMITH
BY
Lockwood, Woodard, Smith & Weikart
ATTORNEYS United States Patent Office 3,334,779

Patented Aug. 8, 1967

3,334,779

CLOSURE FOR AUTOMOTIVE FUEL TANKS AND THE LIKE

Richard N. Smith, R.R. 1, Whitestown, Ind. 46075

Filed Sept. 9, 1965, Ser. No. 486,040
10 Claims. (Cl. 220—86)

This invention relates generally to closures of a type facilitating repetitive refilling of a liquid container through a spout.

For many years it has been typical practice on automotive equipment to employ removable, screw-on caps on fuel tank filler pipe spouts. Troubles encountered in the use of such devices have included leaking of fuel from the cap during operation or when a vehicle, for example, is parked on a slope, surging of fuel out the filler pipe during filling operations, the possibility of sparks when metal caps are used, improper installation of the cap, or complete failure to install it, with subsequent loss of the cap.

It is a general object of the persent invention to provide an improved closure for containers for liquids. A further object is to provide a closure eliminating the need for a separable cap, avoiding any spark generation possibilities, avoiding out-of-pipe surges of liquid during filling, avoiding leakage, and generally improving tank filling operations.

Described briefly, a typical embodiment of the present invention is a rubber insert, which is snapped into a tank filler pipe, and has a pair of diaphragms thereacross in spaced relationship. Each diaphragm has radially extending slits from a small central aperture, these slits facilitating sufficient flexure of each of the diaphragms to admit a filling nozzle such as is typically employed on gasoline pump discharge hoses.

The full nature of the invention will be understood from the accompanying drawings and the following description and claims:

FIG. 1 is a section through a fuel tank filler pipe with a typical embodiment of the closure of the present invention incorporated therein.

FIG. 2 is a section taken along the line 2—2 in FIG. 1 and viewed in the direction of the arrows and illustrating the inner diaphragm of the closure.

FIG. 3 is an enlarged fragmentary section through the inner diaphragm taken along the line 3—3 in FIG. 2 and viewed in the direction of the arrows.

FIG. 4 is an end view of the exterior of the outer end of the illustrated embodiment of the invention, this view being taken at the line 4—4 in FIG. 1 and looking in the direction of the arrows.

FIG. 5 is an enlarged fragmentary section through the outer diaphragm taken along the line 5—5 in FIG. 4 and viewed in the direction of the arrows.

Referring to the drawings in detail, FIG. 1 shows a conventional tank 11 having a conventional filler pipe 12 affixed thereto, the tank being shown fragmentarily to conserve space in the drawing. For purposes of one possible example, the tank can be considered mounted in a vehicle, the exterior sheet metal of which is shown at 13 with a recess 14 provided therein and a cover 16 over the recess and hinged at 17, such structure being frequently found in automobiles, for example. The filler pipe 12 extends into the cavity 18 provided by the recess 14 and cover 16 in the conventional manner, and normally a typical installation would have a metal cap installed on the filler pipe 12. According to the present invention, however, an insert 19 is provided in the form of a rubber cylindrical tube 21 having an inner end 22 disposed well inside the filler pipe and having a generally circular flange or inverted cup configuration at the outer end 23. This is received on the outer end 24 of the filler pipe whereby the unit is supported on the filler pipe and prevented from falling into the tank 11. To keep it tightly in place, a circular flange 26 is provided and is of increasing diameter at increasing distances from the end 22 and then terminates to provide a notch face 27 facing the retainer flange. This face engages the inwardly turned edge 28 of the filler pipe and the distance between the edge 28 and end 24 of the filler pipe, and between the locking face 27 and retainer surface 29 of the retainer flange are such that a secure fit of the insert on the filler pipe is provided. A seal is thereby provided all the way around the upper end of the filler pipe where it engages the closure of the present invention. There is therefore no chance of leakage of fuel from the annular cavity 31 outward around the edge 28.

If desired, the retainer flange can be provided with a skirt 32 engaging the portion 33 of the vehicle body metal recess.

Further according to the present invention, an outer diaphragm or cover 34 is provided at the outer end of the closure and is convex in nature to provide a smooth outer appearance as shown in FIG. 1. A second diaphragm 36 extends across the tube 21 perpendicular to the axis 37 thereof and has a central aperture 38 therein. This diaphragm is cut along three lines 39, 41, and 42 extending radially outward from the central aperture 38 to the inner face 43 of the tube wall. The upper diaphragm is also provided with similar cuts 44, 46, and 47 extending from the axis 37 as shown in FIG. 4.

The slits or cuts in the two diaphragms divide each of them into three segments, and because the material of which the present invention is typically made is resilient, the filler nozzle 48 connected to a filler hose from a gasoline pump, for example, can be pushed into the tube thus deflecting the diaphragm segments downwardly as indicated by the dotted outlines in FIG. 1. The edges of the cuts in the upper diaphragm are bevelled as shown in FIG. 5, the edges at cut 44 being designated **44*a* and 44*b* and touching each other at 44*c* at the top edge or surface 34*t* of the upper diaphragm. In this way they serve as wiping edges so that any dirt which may possibly be present on the nozzle 48** will be wiped upwardly thereon as the nozzle is inserted into the closure of the present invention.

Similarly, the cuts in the lower diaphragm are bevelled as shown in FIG. 3 with the edges **42*a* and 42*b* being bevelled outwardly and upwardly from the lower surface 361 of the inner diaphragm so that where the edges meet at 42*c***, they serve to wipe downwardly any gasoline on the nozzle as it is withdrawn from the filler pipe.

Because the edges of the diaphragms meet, gasoline or whatever other fluid may be in the tank or container cannot leak past these edges. Furthermore, although a central aperture 38 is provided in the lower diaphragm, it need be made only large enough to permit whatever gasoline is in the space 49 between the diaphragms to enter the tank as the gasoline is used from the tank after it has been filled clear up to just below the upper diaphragm. Of course it is not desirable to fill a tank that full but in the event it is done, there is no difficulty permitting the gasoline in the space 49 to pass into the tank.

Whatever venting may be needed, can be provided for by a very small central aperture in the upper diaphragm. Normally, however, the meeting of the three edges at this point at the upper surface provides sufficient flexibility to permit whatever natural venting is necessary. The natural venting which occurs at the edges as gases in the tank expand can serve to keep them clean. Also, because of this arrangement, and the natural venting resulting therefrom, atmospheric pressure is easily maintained in a fuel tank as fuel is used, so there is no danger of tank collapse or air lock in the tank. Where the tank is used for fuel, as in a vehicle for example, the free venting on demand makes the work of the engine fuel supply system easier.

Now that the invention has been disclosed, it will be apparent that the troubles described above are overcome thereby. Embodiments other than that illustrated may occur to those skilled in the art and are intended to be covered by the appended claims.

The invention claimed is:

1. A closure for a liquid container, said closure comprising:

an elongated tube receivable in a container filler pipe, said tube having first and second ends and arranged for insertion of said first end first into the filler pipe, and said tube having retainer means at the second end, said retainer means being receivable on the outer end of the filler pipe to support said tube in position in the pipe with the second end of said tube adjacent the outer end of the filler pipe;

means on said tube for making a seal between the exterior thereof and the interior of the filler pipe in which it is received, adjacent the outer end of the filler pipe, to prevent loss of a liquid from the filler pipe, and a first diaphragm across the second end of said tube, said first diaphragm having admitting means therein permitting said diaphragm to admit a filler nozzle through the diaphragm into said tube.

2. The closure of claim 1 wherein:

said first diaphragm is made of a resilient material and the admitting means in said first diaphragm include a cut therein permitting portions of said diaphragm adjacent the cut to be flexed by pushing a filler nozzle against said diaphragm to thereby admit the nozzle.

3. A closure as set forth in claim 1 and formed integrally of an elastomer material, said first diaphragm automatically closing the tube after an admitted nozzle is removed.

4. The closure as set forth in claim 1 wherein:

said tube has a circular flange on the outer surface thereof increasing in diameter at a gradual rate at increasing distances from said first end of said tube and terminating in a ledge facing said retainer means and engageable with an inwardly turned flange of the container filler pipe, said circular flange and retainer means being spaced to snap into locking and sealing connection with the filler pipe upon insertion of said tube in the pipe, said tube having a skirt around said retainer means and disposed for engagement with a generally flat surface surrounding a filler pipe, the said first diaphragm being generally rounded and blending in with the retainer means and skirt to provide a generally rounded neat appearing closure for the filler pipe.

5. The closure as set forth in claim 1 wherein:

the admitting means of said first diaphragm includes a cut with the facing edges thereof bevelled outwardly from the meeting line thereof at the top surface of said first diaphragm, to provide wiping edges at the top surface in contact with each other.

6. The closure of claim 1 and further comprising:

a second diaphragm across the interior of said tube near said first end thereof and having admitting means therein permitting said second diaphragm to admit a filler nozzle therethrough.

7. A closure as set forth in claim 6 wherein:

at least one of said diaphragms has an aperture therein and said admitting means therein includes cuts extending outwardly from said aperture, said aperture being of a small size to permit liquid drain back from one side of said one diaphragm to the other side of said one diaphragm.

8. The closure as set forth in claim 6 and wherein:

the admitting means of said second diaphragm includes a cut with the facing edges thereof bevelled outwardly from the meeting line thereof at the lower surface of said second diaphragm whereby wiping edges are provided at the cut therein at the lower surface thereof, with a clearance space thereabove.

9. The closure of claim 6 wherein:

said admitting means are a plurality of cuts extending radially outward from the center of said closure and said diaphragms are segmented by said cuts.

10. A closure for a liquid container, said closure comprising:

a member having a first portion receivable in a container filler pipe and a second portion adapted to retain said first portion near the entry end of the filler pipe, said first portion having projecting means thereon, said projecting means and said second portion being spaced to snap into locking and sealing connection with the filler pipe upon insertion of said first portion into the entry end of the pipe, said first and second portions having communicating central openings therein, and a first diaphragm across said second portion, said first diaphragm having admitting means therein permitting said diaphragm to admit a filler member through the diaphragm into said opening in said first portion.

No references cited.

THERON E. CONDON, *Primary Examiner.*

J. B. MARBERT, *Assistant Examiner.*